United States Patent [19]

Seiz et al.

[11] Patent Number: 4,687,404
[45] Date of Patent: Aug. 18, 1987

[54] LOAD TRANSFER APPARATUS FOR PUSH-IN FLOW RACKS

[75] Inventors: Frederick G. Seiz, Telford; Carl G. Seiz, Hatfield; Robert J. Egner, Quakertown, all of Pa.

[73] Assignee: Seiz Corporation, Perkasie, Pa.

[21] Appl. No.: 704,286

[22] Filed: Feb. 22, 1985

[51] Int. Cl.⁴ .............................................. A47F 5/00
[52] U.S. Cl. .................................... 414/276; 211/151; 414/286
[58] Field of Search ...................... 414/267, 276, 286; 211/151, 162

[56] References Cited

U.S. PATENT DOCUMENTS

| 3,038,613 | 6/1962 | Sylvester et al. | 211/162 |
| 3,179,258 | 4/1965 | Halberstam | 211/151 |
| 3,399,784 | 9/1968 | Buchbinder et al. | 211/151 |
| 3,465,894 | 9/1969 | Setecka | 211/151 X |
| 3,982,639 | 9/1976 | Haldimann et al. | 414/276 |
| 4,136,783 | 1/1979 | Karashima | 211/49 D |
| 4,155,462 | 5/1979 | Bendel | 211/151 |
| 4,234,069 | 11/1980 | Seiz et al. | 193/35 A |
| 4,341,313 | 7/1982 | Doring | 211/151 |
| 4,462,500 | 7/1984 | Konstant et al. | 211/151 |
| 4,613,270 | 9/1986 | Konstant et al. | 414/276 |

FOREIGN PATENT DOCUMENTS

1141231 12/1962 Fed. Rep. of Germany ...... 414/276

Primary Examiner—Robert J. Spar
Assistant Examiner—David A. Bucci
Attorney, Agent, or Firm—Howson and Howson

[57] ABSTRACT

A multi-load position push-in flow rack capable of moving and storing loads in tandem comprises front and rear uprights mounting a pair of horizontally spaced inclined rails on which load transfer apparatus is mounted. The load transfer apparatus comprises an elongated carriage supported for reciprocation on the rails by a lower series of wheels and a shorter load support mounted for reciprocation relative to the carriage by an upper series of wheels which are located on the carriage and which engage the undersides of the load support. Abutments are provided at the rear end of the carriage for coupling the load support to the carriage so that they can move together when loaded. Stops are provided at the front and rear ends of the rack to limit the travel of the carriage therein. In the course of loading, the load support with a first load thereon is pushed rearwardly relative to the carriage to expose the front of the carriage for accepting a second load and to couple the load support to the carriage. The carriage and load support are then pushed rearwardly in unison to expose the rails adjacent the front of the rack for accepting a third load. Other embodiments for storing and transferring four and five loads are disclosed.

30 Claims, 8 Drawing Figures

FIG. 1

FIG. 3

LOAD TRANSFER APPARATUS FOR PUSH-IN FLOW RACKS

FIELD OF THE INVENTION

The present invention relates to push-in flow racks, and more particularly, the present invention relates to storage racks capable of receiving a plurality of loads at the front of the rack, of supporting them in tandem, and of delivering the loads one-by-one for unloading from the front of the rack.

BACKGROUND OF THE INVENTION

In a typical flow rack, a pair of inclined rails are mounted in horizontally spaced relation to a series of uprights for supporting loaded pallets. Loaded pallets are inserted at the rear of the rack and flowed by suitable gravity operated means to an unloading position at the front of the rack. In a push-in type flow rack, the pallets are normally loaded and unloaded at the front of the rack, being pushed backward up the inclined rails during loading and flowing forward down the rails during unloading.

In U.S. Pat. No. 4,234,069, a flow rack having pallets with speed control means associated therewith is provided. The speed control means functions to limit the speed of the loaded pallets as they advance down the rails. In certain embodiments of this patented flow rack, the pallets are designed so that they can be removed from the rack, loaded and replaced.

In U.S. Pat. No. 4,341,313, a three pallet position push-in flow rack is disclosed. In the disclosed push-in flow rack, a pair of dollies are mounted for movement on inclined rails. One dollie is higher than the other and is designed to nest with respect to the other at the front end of the rack when the rack is unloaded. During loading, a load is placed first on the higher dollie. Then, as a second load is placed in the rack on the lower dollie, the first loaded dollie is pushed rearwardly. Thereafter, as a third load is placed on the rails in the rack, the first and second loaded dollies are pushed rearwardly. Thus, when fully loaded, the rack contains three loaded pallets arranged end-to-end. As first and second loads are removed from the dollies, they roll down the rails toward the front of the rack. A similar arrangement is disclosed in U.S. Pat. No. 4,462,500. Other types of storage systems having live bottoms are disclosed in the following U.S. Pat. Nos.: 3,038,613; 3,179,258; 3,399,784; and 4,136,783.

While the apparatus disclosed in the aforementioned patents may function satisfactorily for their intended purposes, there is a need for improved load transfer apparatus for push-in flow racks, which apparatus is compact to enable a maximum volume of goods to be stored in a minimum of space, which can be manufactured readily, which is rugged in construction, which is relatively trouble-free in operation, and which can be retrofitted into existing push-in flow racks.

OBJECTS OF THE INVENTION

With the foregoing in mind, a primary object of the present invention is to provide for a push-in flow rack, compact load transfer apparatus which is particularly suited for accepting loads one-by-one at the front of the rack for loading, of supporting the loads end-to-end in the rack, and of delivering the loads one-by-one to the front of the rack for unloading.

Another object of the present invention is to provide a push-in flow rack having a novel load transfer system which can be manufactured economically, installed readily, and used easily.

A further object of the present invention is to provide for a push-in flow rack, unique load transfer apparatus which has a minimum of components and which is rugged and reliable in operation.

Yet another object of the present invention is to provide improved load transfer apparatus which can be installed readily in existing push-in flow racks.

SUMMARY OF THE INVENTION

More specifically, the present invention provides a storage rack in which a series of loads may be stored end-to-end and transferred by load transfer means to and from a loading and unloading location at the front of the rack. The rack comprises front and rear uprights mounting a pair of rails in horizontally spaced inclined relation. In one embodiment, an elongated carriage having a length sufficient to support at least two loads is provided with a lower series of wheels engaging the rails for mounting the carriage to move back and forth thereon. A load support overlies a portion of the carriage and is mounted for movement relative thereto by an upper series of wheels on the carriage. Abutments are provided at least at the rear end of the carriage for releasably coupling the load support to the carriage so that when operatively engaged they move rearwardly in unison on the rails. Stops are provided at the front and rear ends of the rails for engaging the carriage to limit its movement in the rack. Detents are provided on the rails adjacent the front of the rack for releasably engaging the lower front carriage wheels to assist in holding the carriage stationary during loading.

When unloaded, the carriage rests against the stops at the front of the rack with the load support overlying the carriage and ready to receive a first load, such as a loaded pallet. As a second loaded pallet is placed in the rack, it engages the load support edgewise and pushes it rearwardly until the load support engages the rear abutment on the carriage to couple the load support and carriage and to expose the front of the carriage, whereupon the second loaded pallet can be lowered onto the carriage in front of the first loaded pallet on the load support. When a third loaded pallet is placed in the rack, it engages the carriage edgewise, and with the load support and carriage coupled, it pushes both the carriage and load support rearwardly until the carriage engages the rear stop in the rack, whereupon the third load pallet can be lowered and supported directly on the rails in front of the carriage. The detents on the rails prevent the carriage from moving rearwardly as the load support moves rearwardly relative to the carriage while the second pallet is being pushed rearwardly in the rack.

In other illustrated embodiments, the load transfer apparatus is modified to support and transfer either four or five loads.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
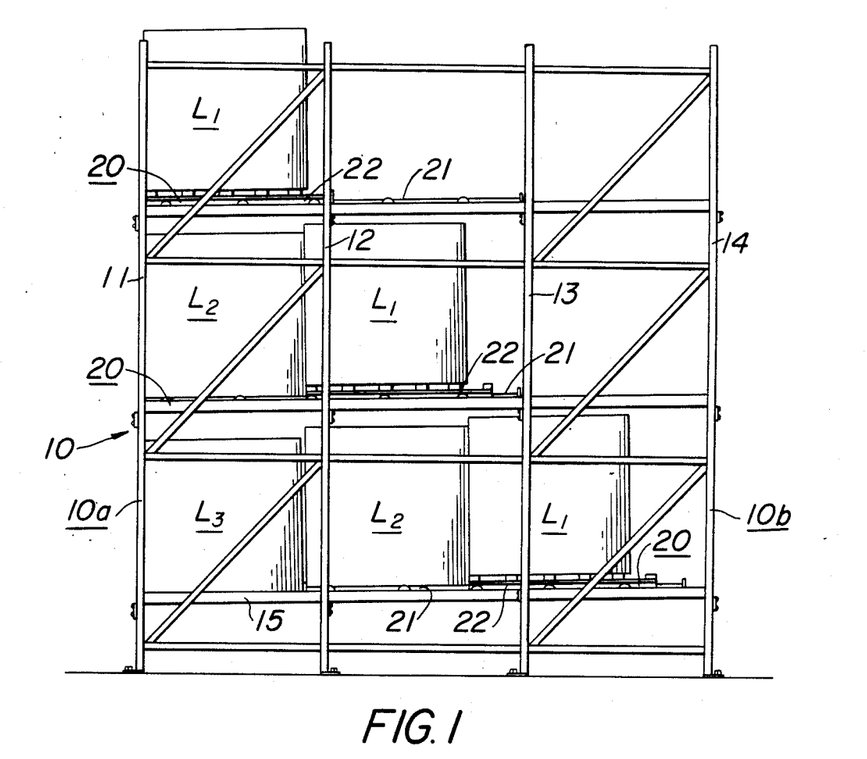
FIG. 1 is a side elevational view in reduced scale of a push-in flow rack having load transfer apparatus embodying the present invention.

Referring now to the drawings, FIG. 1 illustrates a push-in flow rack 10 having load transfer apparatus 20 embodying the present invention. The illustrated push-in flow rack comprises a series of pairs of uprights 11, 12, 13, 14 extending from front to rear and mounting a pair of L-shaped rails 15, 16 (FIG. 3) in horizontally spaced inclined relation.

In the push-in flow rack illustrated in FIG. 1 loads are shown three deep in the lowermost bay, two deep in the next higher bay, and one deep in the uppermost bay. In the art, the illustrated rack is termed a three load position push-in flow rack. While three tiers, or bays, are provided for supporting loads three deep at three levels in the illustrated rack, it should be understood that the present invention has applicability to push-in flow racks with greater or fewer bays of greater or lesser depths.

The first load position is located adjacent to the front 10a of the rack 10. The second load position is located inwardly adjacent thereto. The third load position is located adjacent to the rear 10b of the rack 10. As will be discussed, the push-in flow rack may store loads, either on pallets or slip sheets, at various depths in the bays and at various heights in the rack. However, when only one or two loads are in a rack, they will assume the positions illustrated in the uppermost and second highest bays in FIG. 1, respectively.

Figures 2, 4:
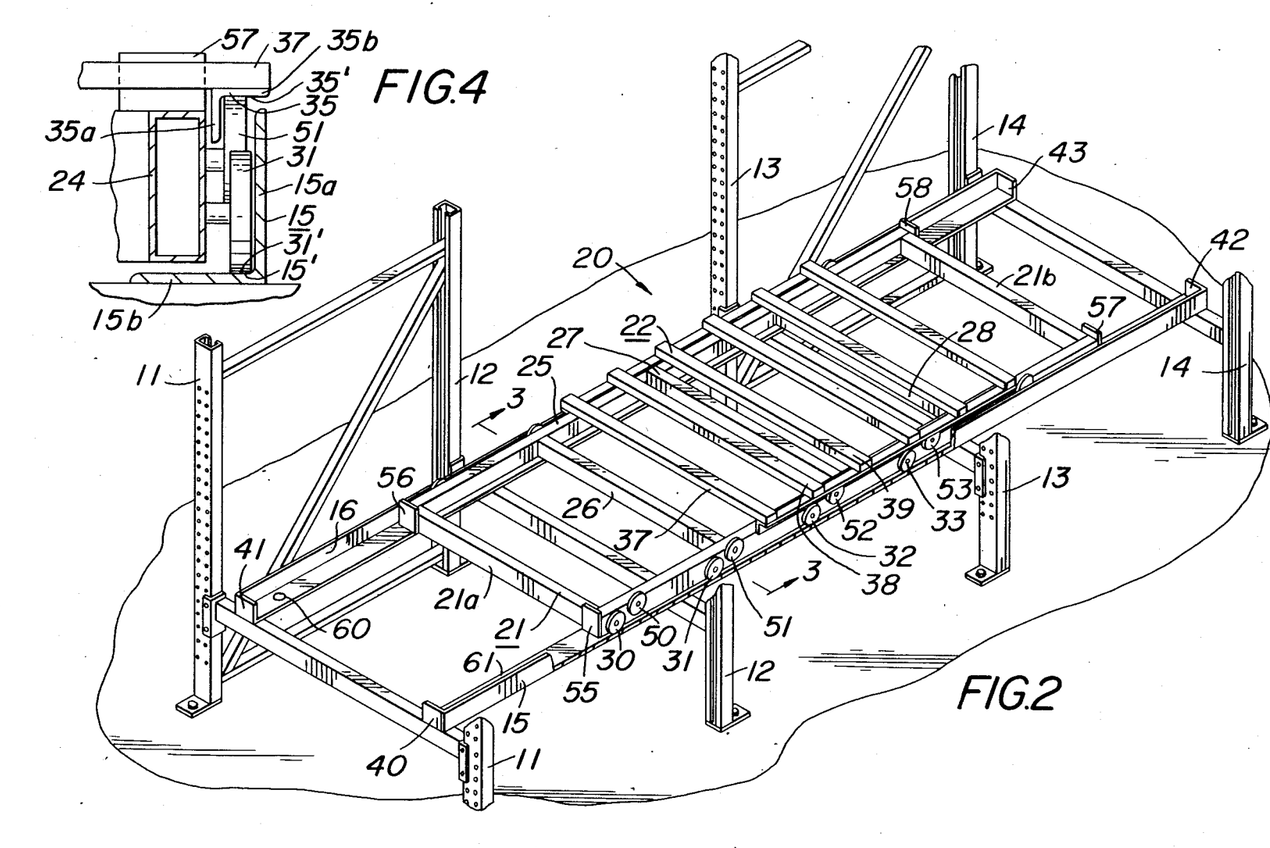
FIG. 2 is a fragmentary perspective view of the flow rack illustrated in FIG. 1 with portions broken away to illustrate certain details of construction of the load transfer apparatus used therein.
FIG. 4 is a greatly enlarged fragmentary sectional view illustrating certain details of construction.

Referring now to FIG. 2, the present invention comprises compact load transfer, or transport, apparatus 20 which is capable of accepting multiple loads sequentially at the front of the rack for loading, of transferring them in the rack for storage, and of delivering them sequentially to the front of the rack for unloading. To this end, the load transfer apparatus 20 comprises an elongated carriage 21 adapted to reciprocate, or ride back and forth, on the rails 15, 16, and a load support 22 adapted to reciprocate, or ride back and forth, relative to the carriage 21. In the embodiment of FIGS. 1–4, the carriage 21 has a length corresponding to two load, or pallet, positions, and the load support 22 has a length corresponding to only one load position. Thus, for example, if the upper surface of the carriage 21 were completely exposed, it could support two standard size (48 inches × 40 inches) pallets end-to-end from front to rear thereon, and the load support 22 could support one pallet.

In this embodiment, the carriage 21 comprises a pair of elongated frame members 24, 25 overlying the rails 15, 16, respectively and a series of transverse connecting members 26, 27, 28 extending in spaced relation between the front and the rear ends 21a and 21b, respectively of the carriage 21. Preferably, the carriage 21 has a widthwise dimension sufficient to enable it to support a standard size pallet widthwise and to fit within the upstanding flanges of the L-shaped rails 15, 16 with a clearance between the sides of the frame members 24, 25 and the rails 15, 16.

In order to enable the carriage 21 to move back and forth in the rack 10 first rotatable means are provided on the rails. To this end, a lower series of wheels are mounted in spaced relation to each frame member for rolling on the horizontal flanges of the rails, such as the lower series of wheels 30, 31, 32, 33 mounted to the frame member 24 for rolling on the horizontal flange 15b of the rail 15. The lower wheels 30–33 are sized and their axles located so that their lower peripheries project edges, such as the edge 31', outboard of the frame members for engaging the fillet 15' connecting the vertical and horizontal flanges 15a and 15b, respectively, of the rail 15. This aids in centering the carriage 21 on the rails 15 and 16 as the carriage moves back and forth in the rack. Preferably, the wheels are provided at equally-spaced intervals, such as 18 inch centers, along the length of each carriage frame member to distribute loads on the rails in a desirable manner. It should be apparent, however, that the number of wheels can vary, depending on load.

For the purpose of limiting the travel of the carriage 21 in the rack 10, front and rear stop means are provided adjacent the front 10a and rear 10b of the rack 10. In the illustrated embodiment, the front stop means comprises a pair of plates 40, 41 either welded or bolted transversely across the front ends of the rails 15, 16, respectively, and the rear stop means comprise a like pair of plates 42, 43 similarly either welded or bolted across the rear ends of the rails 15, 16, respectively. Thus, the front stops 40, 41 cooperate with the carriage 21 to limit forward movement of the carriage 21 in the rack, and the rear stops 42, 43 likewise limit rearward movement of the carriage 21 therein.

The load support 22 overlies only a portion of the carriage 21 and is mounted for back and forth movement relative to the carriage 21. In the embodiment illustrated in FIGS. 1–4, the load support 22 is dimensioned lengthwise and widthwise to accept a single load, such as a pallet of conventional size. Thus, the carriage 21 is exposed for about half its two load, or pallet, length.

The load support 22 comprises a pair of elongated runners 35, 36 connected together widthwise by means of a series of stringers 37, 38, 39 providing a deck. Preferably, as best seen in FIG. 4, each runner, such as the runner 35, is provided by an L-shaped angle member having a depending vertical flange 35a and an outturned horizontal flange 35b. The vertical flange 35a extends along the outer side of the carriage frame member 24, and the horizontal flange 35b is adapted to overlie the upper edge of the upstanding flange 15a of the rail member 15.

For the purpose of movably mounting the load support 22 on the carriage 21, second rotatable means is provided between the carriage 21 and the load support 22. To this end, an upper series of wheels are mounted on each of the carriage frame members at spaced locations along their lengths. Preferably, the wheels 50-53 in the upper series are located sufficiently closely, i.e. on about 9 inch to 12 inch centers, as to enable at least a pair of wheels on each side of the carriage, such as the wheels 52, 53, to engage the load support 22 as it moves relative to the carriage 21.

The upper series of wheels, such as the wheels 50, 51, 52 and 53, are sized and their axles located so that their peripheries project upwardly above the frame members 24 and 25 to engage the horizontal flanges of the load support runners and to space the deck stringers 37-39 from the carriage 21. As best seen in FIG. 4, the downturned flange 35a of the load support runner 35 engages between the insides of the wheels 50-53 in the upper series and the outer side of the frame member 24 to maintain the load support 22 laterally engaged with the carriage 21 as they move relative to one another. The wheels 50-53 preferably have edges which interact with the fillet 35' connecting the vertical and horizontal flanges 35a and 35b of the load support runner 35 to aid in guiding the load support 22 as it moves back and forth. Moreover, as best seen in FIG. 4, the wheels 50-53 in the upper series have inside surfaces located slightly closer to the frame member 24 than the insides of the lower wheels to ensure smooth movement of the load support 22 relative to the carriage 21, particularly during loading of the second load onto the carriage 21 as will be discussed.

In order releasably to couple the load support 22 to the carriage 21 so that they can move in unison on the rails 15, 16, means is carried by the carriage at least at the rear end thereof. In the present instance, the coupling means includes abutment means at both the front and rear of the carriage 21 to limit movement of the load support 22 in opposite directions thereon. Preferably, the front abutment means includes a pair of abutment plates 55, 56 which project upwardly above the carriage frame members 24 and 25 into the path of movement of the load support runners 35, 36 respectively. The front abutment plates 55, 56 may be welded or bolted to the front ends of the carriage frame members 24, 25 respectively at the front end 21a of the carriage 21, and in like manner, a pair of rear abutment plates 57, 58 are mounted to the rear end 21b of the carriage 21. It is the rear abutment plates 57, 58 which couple the carriage 21 and load support 22 for movement rearwardly in unison in the rack 10.

In order releasably to secure the carriage 21 adjacent the front of the rack 10 during loading, and particularly to prevent it from moving rearwardly during placement of the second load on the carriage 21, braking means is provided. In the illustrated embodiment, the braking means includes detents provided by a pair of carriage bolts, 60, 61 such as the bolt 60 extending through the lower flange of the rail 16. The carriage bolts 60, 61 are located with their heads on top of the rail flanges. Desirably, the detent bolts 60, 61 are located less than about two inches behind the lower front wheels of the carriage 21 when it is engaged with the front rail stops 40 and 41. Thus, the bolts 60, 61 engage behind the front wheels in the lower series of carriage wheels to releasably retain the carriage 21 in its forwardly located position during placement of the first two loads in the rack. The detents are, however, sufficiently small as to enable the carriage 21 to be pushed rearwardly therepast in the course of placing the third load in the rack.

Figure 3:
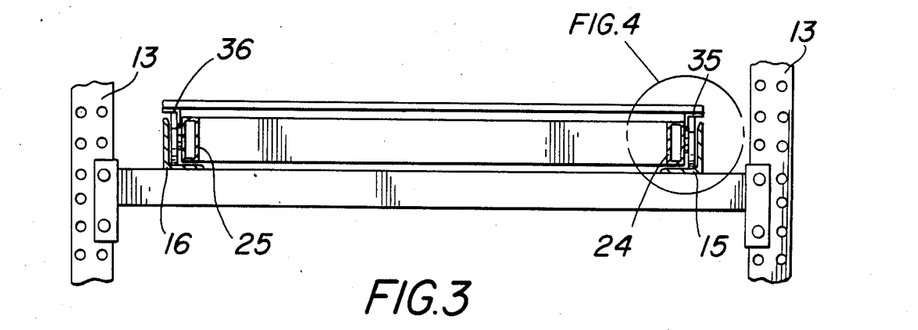
FIG. 3 an enlarged sectional view taken on line 3—3 of FIG. 2.

The load transfer apparatus of the present invention is compact. As best seen in FIG. 3, when engaged, the carriage 21 and load support 22 present a relatively low profile, having a combined thickness only slightly greater than the vertical extent of the rails. As a result, the present invention minimizes the space required for the load transfer apparatus and thereby maximizes the space between tiers to provide a spatially efficient storage system.

In use, let it be assumed that the rack 10 is completely unloaded and ready to be loaded. In such a condition, the carriage 21 will be located on the rails 15 and 16 with its forward abutment plates 55 and 56 engaged with the front stop plates 40 and 41 on the rails. The load support 22 will be located on the carriage 21 with the front edges of its runners 35 and 36 engaged with the abutment plates 55 and 56 at the front of the carriage 21. Thus, the load support 22 will overlie the front half of the carriage 21, the rear half of which will be exposed.

To load the rack 10, a forklift truck or crane operator places a first load on the load support 22, such as in the manner in which the load $L_1$ is illustrated in the uppermost level in FIG. 1.

When it is desired to place a second load $L_2$ in the same bay, the operator positions the second load, or pallet on which it is supported, in endwise engagement with the front deck stringer 37 of the load support 22 and pushes the second load $L_2$ into the bay. As the operator pushes the second load $L_2$ deeper into the bay, it pushes the loaded load support 22 rearwardly ahead of it relative to the carriage 21 until the load support 22 engages the rear abutment plates 57 and 58 on the carriage 21, whereupon movement of the load support 22 is arrested, and the load support 22 is coupled to the carriage 21. The detents 60, 61 ensure that the carriage 21 remains stationary as the load support 22 moves relative to the carriage 21. Thus, the front portion of the carriage 21 is exposed so that the operator can lower the second load $L_2$ on the front portion of the carriage 21, thereby causing two loads to be stored in the rack 10 such as in the manner the loads $L_1$ and $L_2$ are illustrated in the second highest bay in FIG. 1.

When it is desired to place a third load in the rack 10, such as the load $L_3$, the operator pushes the third load rearwardly in the rack until either its rear edge, or the rear edge of the pallet on which it is supported, engages the front 21a of the carriage 21. Thereafter, as the operator pushes the load rearwardly, the carriage 21 moves rearwardly on the rails 15 and 16 and past the detents 60, 61 by virtue of the coupling of the load support 22 with the rear abutment plates 57 and 58 of the carriage 21. Further rearward pushing causes the carriage 21 and load support 22 to continue to move rearwardly in the rack 10 until the rear end 21b of the carriage 21 engages the rear stops 42, 43 at the rear ends of the rails 15, 16. This exposes the rails 15 and 16 adjacent the front of the rack 10a ahead of the carriage 21. The operator can then lower the third load directly onto the horizontal flanges of the rails 15 and 16 in front of the carriage 21 to complete the rack loading operation. Thus, the bay is completely filled with loads in each position, such as in the manner illustrated in the lowermost bay in FIG. 1. The presence of the third load between the front end 21a of the carriage 21 and the stops 40, 41 at the front ends of the rails 15, 16 insures that the carriage 21 is maintained in its rearwardmost position even in the event that the rack 10 should be jarred, as by being struck inadvertently by a lift truck.

The rack 10 is unloaded at a controlled rate by reversing the aforementioned loading procedure. For instance, after the third load has been lifted from the rails 15, 16, the forklift or crane operator can control the speed with which the carriage 21 rolls down the rails 15, 16 by maintaining the third and second loads engaged edgewise as he backs away from the rack 10. In like manner, when the second load is lifted from its position on the front of the carriage 21, the first load on the load support can be rolled forwardly at a controlled speed until the front edges of the load support runners 35, 36 engage the front abutment plates 40, 41 on the carriage 21. Thus, the entire load transfer apparatus is unloaded and automatically repositioned at the front of the rack for reloading.

Figure 5:
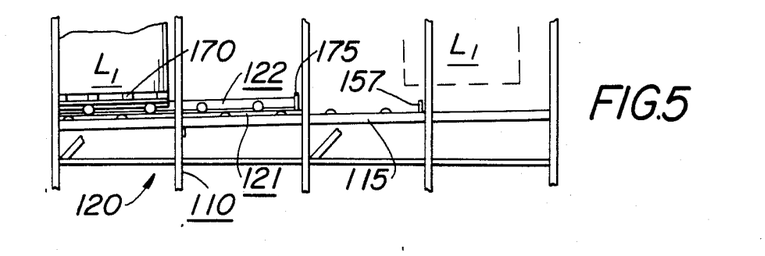
FIG. 5 is a fragmentary side elevational view, similar to FIG. 1, but illustrating a four load position rack incorporating load transfer apparatus.

In the embodiment of FIGS. 1-4, the load transfer apparatus 20 enables loads to be supported three deep in a three load position storage rack. To enable loads to be transferred and stored four deep in a four load position push-in flow rack, modified load transfer apparatus is provided. In this modified embodiment illustrated in FIG. 6 (Sheet 3), the load transfer apparatus 120 is mounted in a rack 110 on a pair of inclined rails 115, like the rails 15, 16 extending from front to rear in the rack 110. The load transfer apparatus 120 comprises an elongated carriage 121, like in construction to the carriage 21 described heretofore, a load support 122 like in construction to the load support 22 described heretofore, and a load platform 170 like in construction to the load support 122. As best seen in FIG. 5, the carriage 121 is elongated and extends through at least three load positions in the rack 110. The load support 122 is similarly elongated and extends through two load positions. The load platform 170 extends through but a single load position in the rack 110.

Figures 6, 8:
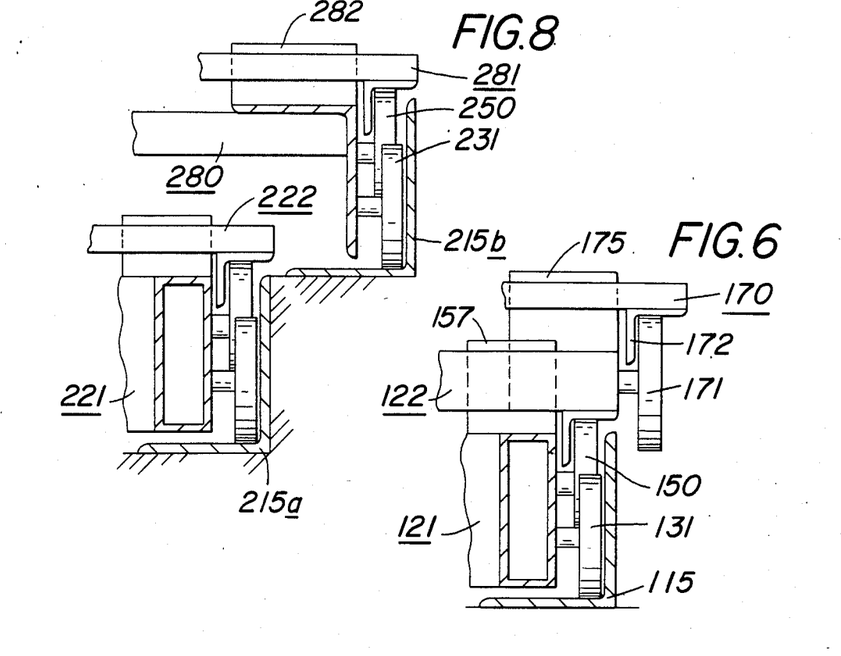
FIG. 6 is a fragmentary cross-sectional view similar to FIG. 4 but illustrating the modified load transfer apparatus in the four load position rack of FIG. 5.
FIG. 8 is a fragmentary cross-sectional view similar to FIGS. 4 and 6 but illustrating the modified load transfer apparatus in a five load position rack.

The carriage 121 is mounted for reciprocation in the rack 110 by a series of wheels, such as the wheel 131 illustrated in FIG. 6, arranged with like wheels such as in the manner illustrated in FIG. 2. The load support 122 is mounted for reciprocation relative to the carriage 131 by a series of wheels, such as the wheel 150, also arranged with like wheels such as in the manner illustrated in FIG. 2. An abutment or coupling plate 157 is mounted at the rear end of the carriage 121 for the purpose of coupling the load support 122 with the carriage 121 in the manner described heretofore. Except for their lengths, the carriage 121 and load support 122 are like in construction to the carriage 21 and load support 22 described heretofore with respect to the embodiment of FIGS. 1-4.

The load platform 170 overlies the load support 122 and is mounted for reciprocation relative to the load support 122. To this end, a series of wheels, such as the wheel 171, are mounted to the load support 122 on opposite sides thereof for engaging runners 172 which extend lengthwise along the underside of the load platform 170 in much the same manner in which the runner 35 is mounted to the load support in the embodiment of FIGS. 1-4. A rear abutment plate 175 is mounted at the rear end of the load support 122 for engaging the load platform 170 in much the same manner and for the same purpose as the rear abutment plate 157 is mounted to the carriage 121 for engaging the load support 122. Thus, the load platform 170 overlies one load position of the load support 122 which, in turn, overlies two load positions of the carriage 121. Hence, the load platform 170, the load support 122 and the carriage 121 are arranged in the manner illustrated in FIG. 6 when a single load $L_1$ is in the rack 110.

In the course of placing additional loads in the rack 110, the first load $L_1$ is displaced rearwardly (rightward in FIG. 5) until the rear end of the load platform 170 engages the abutment plate 175 on the load support 122, whereupon the load support 122 and load platform 170 are coupled and the front portion of the load support 122 is exposed for accepting a second load. Thereafter, as a third load is inserted in the rack 110, it engages the front end of the load support 122 and pushes it rearwardly until its rear end engages the rear abutment plate 157 of the carriage 121 to couple the carriage 121 to the load support 122 and to expose the front portion of the carriage 121 for accepting the third load. When a fourth load is placed in the rack, it engages the front end of the carriage 121 and pushes the carriage 121, the load support 122 coupled thereto, and the load platform 170 coupled to the load support 122, rearwardly in the rack 110 until the rear end of the carriage 121 engages the rear stop (not shown) in the rack 110. This leaves the front portions of the rails exposed for accepting the fourth load. Thus, four loads can be placed in the rack in tandem for storage and unloaded therefrom by reversing the aforementioned procedure.

Figure 7:
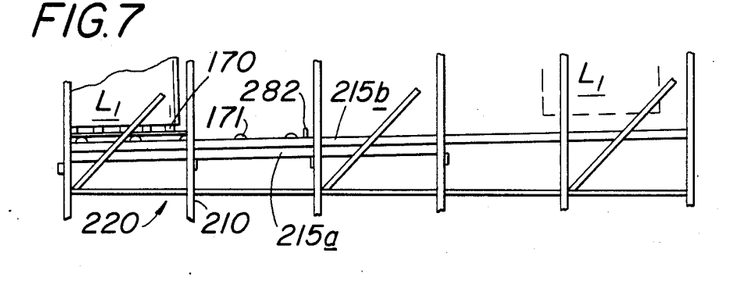
FIG. 7 is a view similar to FIG. 5 but illustrating a five load position storage rack incorporating another modified load transfer apparatus.

In yet another embodiment of the present invention, a load transfer system 220 is provided for a storage rack having five tandem load positions. To this end, as best seen in FIGS. 7 and 8, the storage rack 210 comprises a series of uprights to which are mounted a first pair of rails 215a and a second pair of rails 215b. In the embodiment illustrated in FIG. 8, the first pair of rails 215a are inclined and extend through three load positions in the rack 210. The second pair of rails 215b extend alongside the first pair of rails 215a at a slightly higher level and through five load positions in the rack 210. As best seen in FIG. 8, the rails in each pair are preferably L-shaped and are arranged symmetrically in an upwardly and outwardly offset relation to one another.

The load transfer apparatus 220 associated with the rack 210 comprises a carriage 221, like in construction to the carriage 21, and a load support 222 like in construction to the load support 22. The carriage 221 and load support 222 function in the same manner as the carriage 21 and load support 22 described heretofore with respect to the embodiment of FIGS. 1-4. In the embodiment of FIGS. 7 and 8, however, a second carriage 280 is mounted for reciprocation on the second pair of rails 215b. The second carriage 280 is somewhat similar in construction to the first carriage 221, except that its longitudinal frame member is provided by an angle member arranged in the manner shown in order to conserve space. The second carriage 280 has a lower and an upper series of wheels, such as the wheels 231 and 250. The wheel 231 is adapted to ride on the rail 215b in the same manner that the wheel 31 is adapted to ride on the rail 15 in the embodiment of FIGS. 1-4.

In this embodiment, a second load support 281 is mounted to the second carriage 280 for back and forth movement relative thereto. The second load support 281 is like in construction to the load support 22 described heretofore, being adapted to ride on wheels in the upper series, such as the wheel 250, in the same manner as the load support 22 is adapted to ride on the upper wheels 50-53 in the embodiment illustrated in FIG. 2. As in the aforementioned embodiments, a coupling or abutment plate 282 is mounted at the rear end of the second carriage 280 for releasably engaging the second load support 281 after it has been displaced rearwardly a predetermined distance with respect to the second carriage 280 to expose its front portion for accepting a load.

In use, the first and second carriages 221 and 280, and the first and second load supports 222 and 281 are arranged adjacent the front of the rack 210 in the manner illustrated in FIG. 8 When a first load L₁ is placed in the rack 210. In the course of loading a second load in the rack 210, the first load L₁ is displaced rightward until the rear end of the second load support 281 engages the rear abutment plate 282 of the second carriage 280. This exposes the front portion of the second carriage 280 and permits the second load to be deposited thereon.

Thereafter, as the third load is placed in the rack, it engages the front end of the second carriage 280 and pushes it and its second load support 281 rearwardly in unison in the rack 210, functioning in the same manner as described heretofore in the embodiment of FIGS. 1–4. As discussed earlier, each time an additional load is placed in the rack 210, the load transfer apparatus continues to displace the first load L₁ further rearwardly in the rack until it assumes the position indicated by the dotted lines in FIG. 7. When the first load L₁ is in this position, the front portion of the rails 215a adjacent the front end of the rack 210 are exposed to receive the fifth load in much the same manner that the front portions of the rails are exposed to receive the third load in the embodiment of FIGS. 1–4. Thus, a push-in flow rack having the capability of supporting and transferring five loads is provided.

In view of the foregoing, it should be apparent that the present invention now provides a push-in flow rack having improved load transfer apparatus which is capable of accepting a plurality of loads one-by-one at the front of the rack, transferring the loads therein, supporting the loads in tandem in several load positions, and delivering the loads one-by-one for unloading from the front of the rack. The load transfer apparatus has a relatively low vertical profile, thereby making efficient ulilization of vertical space in the rack. Because the load transfer apparatus is of relatively simple design, it can be manufactured readily, and it is rugged, durable and relatively maintenance free. Moreover, the load transfer apparatus of the present invention is capable of being installed in existing push-in flow rack systems having L-shaped inclined rails.

While preferred embodiments of the present invention have been described in detail, various modifications, alterations and changes may be made without departing from the spirit and scope of the present invention as defined in the appended claims.

We claim:

1. In a storage rack having front and rear uprights and at least a first pair of horizontally spaced rails mounted thereto for supporting loads in at least first, second and third load positions, and apparatus for transferring the loads on the rails, the improvement wherein the load transfer apparatus comprises:

an elongated carriage having a front end and a rear end, said carriage spanning across said rails and extending therealong for at least two load positions, means supporting said carriage for reciprocation on said rails, at least one load support extending across said carriage and overlying it lengthwise for a distance less than the length of the carriage by one of said load positions for exposing the other of said load positions, means located between said carriage and said load support for supporting said load support on said carriage and for mounting said load support for translation lengthwise relative to said carriage, releasable means carried on said carriage for engaging said load support and coupling it to said carriage for movement together on said rails when said carriage is pushed rearwardly, and stop means located at spaced locations in said rack for engaging said carriage to limit the extent of its reciptrocation in the rack, said load support normally overlying said carriage in said first load position for receiving a first load when said carriage is engaged with the stop means at the front of the rack, said load support being displaceable rearwardly relative to said carriage into the second load postion to expose the front of the carriage for accepting the second load when said load support is engaged by a second load and said second load is displaced rearwardly in the rack, said load support engaging said releasable coupling means on the carriage for coupling the load support to the carriage and displacing the carriage and load support further rearwardly into the third load position to expose the rails adjacent to the front of the rack for accepting the third load when the carriage is engaged by a third load and said third load is displaced rearwardly in the rack.

2. Apparatus in accordance with claim 1 wherein said carriage support means includes a lower series of members rotatable relative to said rails when said carriage is displaced relative thereto.

3. Apparatus according to claim 2 wherein said rotatable members include wheels mounted on said carriage in spaced relation along its length.

4. Apparatus according to claim 3 wherein said load support mounting means includes an upper series of rotatable members mounted on said carriage in spaced relation along its length.

5. Apparatus according to claim 4 wherein said lower and upper series of rotatable members are located on opposite sides of said carriage, and said upper series of rotatable members include wheels having inner sides located closer to the carriage than the inner sides of the lower series of wheels.

6. Apparatus according to claim 1 wherein said releasable coupling means includes abutment means projecting upwardly from said carriage at the rear end thereof into the path of movement of said load support thereon for causing said carriage to move rearwardly on said rails when said load support is pushed rearwardly.

7. Apparatus according to claim 1 wherein said stop means includes means mounted at longitudinally spaced locations to said rails in the path of movement of the carriage thereon.

8. Apparatus according to claim 1 wherein said load support includes means providing a deck, and said load support mounting means includes rotatable means engaging said load support and rotatable relative to said carriage when said load support is displaced relative to said carriage.

9. Apparatus according to claim 8 wherein said rotatable means are mounted on said carriage, and said load support includes a pair of runners extending lengthwise of said carriage and engaging said rotatable means.

10. Apparatus according to claim 9 wherein said rotatable means includes an upper series of wheels mounted on opposite sides of said carriage for engaging said load support runners, and said means supporting said carriage on said rails includes a lower series of wheels mounted on said carriage and engaging said rails.

11. Apparatus according to claim 10 wherein said runners are provided by angle members each having a downturned flange disposed between the upper series of wheels and the carriage, an outturned flange engaging the peripheries of the upper series of wheels, and a fillet connecting said flanges for engaging the upper wheels to center the load support relative to the carriage.

12. Apparatus according to claim 11 wherein said rails are mounted in inclined relation in said rack and have upstanding flanges extending outboard of said upper wheels along opposite sides of said carriage, inturned flanges supporting said lower series of carriage wheels, and a fillet connecting said rail flanges for engaging said lower series of wheels for guiding said carriage as it advances on the rails.

13. Apparatus according to claim 1 including braking means cooperable with said carriage for releasably retaining said carriage adjacent the front of said rack as said load support moves relative to said carriage during loading.

14. Apparatus according to claim 1 wherein said coupling means includes abutment means mounted on said carriage for engaging said load support, and including front abutment means in said rack adapted to engage the front of the load support for limiting its forward movement relative to the carriage.

15. Apparatus according to claim 1 including a second pair of horizontally spaced rails mounted in said rack adjacent to said first pair of rails, said second pair of rails extending along said first pair of rails for at least five load positions, a second elongated carriage extending through two load positions and mounted on said second pair of rails for translation thereon, said second carriage being dimensioned lengthwise to accept two loads in tandem, a second load support overlying a single load position of said second carriage, means mounting said second load support to said second carriage for lengthwise relative motion, second means carried by said second carriage for coupling said second load support to said second carriage after said second load support has been displaced rearwardly relative to said second carriage to expose a front load position thereon, whereby said first and second carriages and first and second load supports cooperate to enable loads to be stored at five load positions in said rack.

16. Apparatus according to claim 15 wherein said second pair of rails are located at a higher level than said first pairs in said rack and are spaced outboard thereof.

17. Apparatus according to claim 15 wherein said means mounting said second load support to said second carriage includes a lower series of wheels on said second carriage mounting said second carriage for reciprocation on said second pair of rails, and an upper series of wheels mounting said second load support for movement relative to said second carriage.

18. Apparatus according to claim 15 wherein said second coupling means includes second abutment means projecting upwardly from the rear end of said second carriage for operatively engaging said second load support.

19. For installation in a storage rack having a pair of rails mounted in spaced relation for supporting a plurality of loads in tandem, apparatus for storing loads in the rack and transferring loads therein during loading and unloading, comprising: an elongated carriage having a lengthwise dimension corresponding to at least two load positions in the rack, at least one load support overlying a portion of said carriage and having a lengthwise dimension corresponding substantially to at least one of said load positions, means between said carriage and said load support mounting the load support on said carriage for reciprocation lengthwise relative thereto, rotatable means supporting the carriage for movement on the rails, and means carried on the carriage for releasably coupling the load support to the carriage when the load support is displaced rearwardly through one load position for causing them to move together rearwardly when operatively engaged.

20. For use in a storage rack having a pair of rails mounted in horizontally spaced relation for supporting loads in a plurality of load positions, an elongated carriage having a pair of frame members adapted to overlie the rails and to extend lengthwise therealong for at least two load positions, rotatable means located at spaced locations along the length of said carriage for permitting said carriage to move on said rails, a load support overlying a portion of said carriage for a lengthwise extent sufficient to leave at least one load position exposed on said carriage, rotatable means supporting said load support on said carriage and mounting said load support for translation relative to said carriage, and abutment means located on said carriage for engaging said load support and releasably coupling it to the carriage for movement together on the rails after said load support has been displaced through one load position relative to said carriage.

21. Apparatus according to claim 20 including a load platform overlying on said load support and means mounting said load platform for translation lengthwise of said load support, said carriage having a length corresponding to three load positions, said load support having a length corresponding to two load positions, and said load platform having a length corresponding to one load position, so that when said apparatus is mounted in a rack having rails extending through four load positions, the rack can be loaded with up to four loads in endwise relation therein.

22. Apparatus according to claim 21 including means carried on said load support thereof for releasably coupling said load platform to said load support after the load platform has been displaced through a single load position relative to the load support so that the load platform and load support can move together relative to the carriage until the load support engages the abutment on the carriage, whereupon they move in unison on the rails.

23. For use in a storage rack having a pair of rails mounted in spaced relation and adapted to support loads in a plurality of tandem load positions, load transfer apparatus for use in loading, unloading and storing loads in the rack, comprising: an elongated carriage, a lower series of wheels mounted on said carriage for permitting it to move lengthwise on said rails, a load support overlying said carriage and extending lengthwise thereof for a distance less than the length of the carriage by a single load position, an upper series of wheels mounted on said carriage for permitting said load support to move relative to said carriage, and abutment means mounted on said carriage for engaging said load support to couple it to the carriage for movement together when the load support is pushed relative to the rack.

24. Apparatus according to claim 23 wherein said carriage has a pair of elongated frame members mounting said lower series of wheels in spaced relation thereon, and said load support includes a deck having a pair of runners each with a downturned flange engaging between the upper series of wheels and the frame member and an outturned flange engaging the peripheries of wheels in the upper series.

25. Apparatus according to claim 23 wherein each of said runners has a curved fillet surface connecting the outturned and downturned flanges thereof for cooperating with the upper series of wheels to center the load support relative to the carriage.

26. Apparatus according to claim 23 wherein said carriage has a pair of elongated frame members and said lower and upper series of wheels are mounted to the frame members with the insides of the wheels in the upper series being located closer to the frame members than the wheels in the lower series.

27. Apparatus according to claim 23 including a load platform overlying said load support and extending lengthwise thereof for a single load position, means mounting said load platform for translation lengthwise relative to said load support, and second means for releasably coupling said load platform to said load support after said load platform has been displaced rearwardly relative to said load support through a single load position.

28. Apparatus according to claim 27 wherein said second releasable coupling means includes a second rear abutment plate projecting upwardly from said load support into the path of movement of said load platform.

29. Load transfer apparatus for use in a push-in flow rack having a pair of rails, said apparatus comprising:
an elongated carriage,
rotatable means mounting said carriage for lengthwise recrprocation on said rails,
a load support overlying said carriage for about one-half of its length for exposing the other half thereof,
means rotatable relative to said carriage for supporting said load support on said carriage and mounting said load support for movement lengthwise thereof, and
means engageable by said load support when displaced through a predetermined distance on said carriage to couple said load support to said carriage for movement in unison when said load support is displaced relative to the rack.

30. Load transfer apparatus particularly suited for installation in a gravity operated push-in flow rack having a pair of elongated rails mounted in horizontally spaced inclined relation, said apparatus comprising:
an elongated carriage having a pair of frame members adapted to overlie said rails and to extend through at least two load positions in said rack,
a lower series of wheels mounted on each frame member for supporting said carriage for translation lengthwise of said rails,
a load support overlying said carriage and extending lengthwise thereof for an extent corresponding to one load position less than the lengthwise extent of said carriage,
an upper series of wheels mounted on each frame member for mounting said load support for movement lengthwise of said carriage, and
at least a rear abutment plate mounted on said carriage and projecting upwardly into the path of movement of said load support,
whereby movement of the load support into engagement with the rear abutment plate causes the load support and carriage to move in unison on the rails when the load support is pushed.

* * * * *